United States Patent [19]
Ross

[11] 3,781,570
[45] Dec. 25, 1973

[54] STORAGE CIRCUIT USING MULTIPLE CONDITION STORAGE ELEMENTS

[75] Inventor: Edward Charles Ross, Hopewell, N.J.

[73] Assignee: RCA Corporation, New York, N.Y.

[22] Filed: Nov. 22, 1971

[21] Appl. No.: 200,690

[52] U.S. Cl. 307/238, 307/221 C, 307/279, 307/304
[51] Int. Cl. G11c 11/40
[58] Field of Search 307/221 C, 304, 238, 307/279

[56] References Cited
UNITED STATES PATENTS

| | | | |
|---|---|---|---|
| 3,395,292 | 7/1968 | Bogert | 307/304 X |
| 3,564,429 | 2/1971 | Miller et al. | 307/221 C |
| 3,641,360 | 2/1972 | Yao | 307/304 X |

OTHER PUBLICATIONS
"Toward MOS Memories," Electronics, Vol. 41, No. 22 at 49–50 Oct. 28, 1968.

*Primary Examiner*—John Zazworsky
*Attorney*—H. Christoffersen

[57] ABSTRACT
A storage circuit includes in each stage a metal-nitride-oxide-semiconductor (MNOS) transistor whose threshold voltage is electrically alterable. When the transistors are all at the same threshold level, data bits may be dynamically loaded and stored in the circuit. These bits thereafter may be statically stored by retaining the MNOS transistor of a stage at its original threshold level if the bit stored in that stage is of one binary value and by placing the MNOS transistor at its other threshold level if the bit stored is of the other binary value.

11 Claims, 4 Drawing Figures

STORAGE CIRCUIT USING MULTIPLE CONDITION STORAGE ELEMENTS

STATEMENT

The invention described herein was made in the course of or under a contract or subcontract thereunder with the Department of the Air Force.

BACKGROUND OF THE INVENTION

Dynamic shift registers normally require less components and, therefore, are less expensive than static shift registers. However, dynamic registers employ capacitors for temporary storage and during the circulation of the stored data energy must be added to the registers to compensate for loss of charge from these capacitors. In general then, while dynamic shift registers employ fewer components than static shift registers, they require more operating power and, like other dynamic systems, because stages are continuously switched between different operating states, the possibility of introducing errors is relatively high. Another disadvantage of shift registers using semiconductor devices is that the stored information may be destroyed when power is interrupted, even momentarily.

The present circuit provides solutions to the problems above with a number of components comparable to the number used in a dynamic circuit.

SUMMARY OF THE INVENTION

A data translating stage, suitable for use in storage circuit, which includes a semiconductor device capable of assuming two different conditions. The stage includes means for setting the semiconductor device to one condition for either dynamically storing data bits in the stage or for dynamically translating the data bits from the input to the output of the stage. The stage also includes means for statically storing data bits, said means being responsive to the data bit applied at the input of the stage and to a control voltage applied to the stage for setting the threshold level of said semiconductor device to one or the other of said two different conditions, depending upon the value of said data bit.

DETAILED DESCRIPTION OF THE INVENTION

One type of semiconductor device contemplated for use in practicing the invention has a variable threshold voltage level ($V_T$) which may be electrically set to any one of a multiplicity of values by applying a potential of greater than given amplitude between the gate and substrate of the device and which maintains the threshold voltage ($V_T$) to which it is set for a considerable period of time. Included in this class of devices are field-effect transistors having a metal-insulator-semiconductor (MIS) structure in which charge can be stored.

A specific, but not limiting, example of the above type of transistor is one whose insulating layer is a double layer of silicon nitride and silicon dioxide and which is commonly referred to as an MNOS (metal-nitride-oxide-silicon) device. This transistor may be fabricated using standard metal-oxide semiconductor (MOS) techniques, except that just prior to metallization, the gate oxide is made very thin and a nitride layer is deposited between the silicon dioxide and the gate of the device. The resulting transistor may be either of the P-type or the N-type and has first and second electrodes defining the ends of a conduction path and a gate electrode which is used to control the level of conduction in the conduction path. The transistor has the same general characteristics as a standard MOS device except that the addition of the insulating nitride layer over the thin oxide region allows charge to be stored at or near the interface between the two insulators and results in the characteristics shown in FIGS. 1 and 2.

Figure 1:
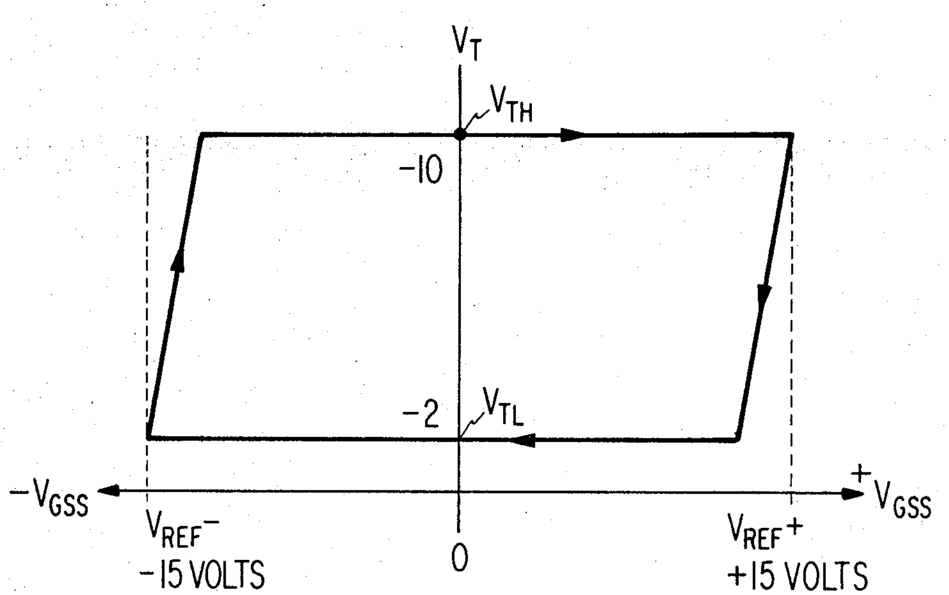
FIG. 1 is an idealized plot of the variations in threshold voltage ($V_T$) as a function of the applied gate-to-substrate potential of an MNOS transistor used in practicing the invention.

FIG. 1 is an idealized representation of the hysteresis characteristic of the $V_T$ as a function of applied gate-to-substrate voltage ($V_{GSS}$) for a P-type conductivity MNOS device. $V_T$ is defined as the gate-to-source potential at which current may start to flow in the conduction path of the transistor. The point marked $V_{TL}$ refers to the low value of $V_T$ and the point marked $V_{TH}$ refers to the high value of $V_T$. $V_{TL}$ may, for example, be minus 2 volts and $V_{TH}$ may be minus 10 volts. The reference voltages $V_{REF}^+$ and $V_{REF}^-$ indicate the gate-to-source potentials at which the transistor changes state. The values of $V_{REF}^+$ and $V_{REF}^-$ depend upon the particular device employed and the pulse width used, however, for purposes of the present discussion, they are assumed to be between −15 volts and +15 volts. That is, a potential of 15 volts applied between the gate and substrate (or semiconductor body) in a direction to inhibit conduction sets the transistor to its low threshold voltage ($V_{TL}$) and a potential of 15 volts applied between the gate and substrate (or semiconductor body) in a direction to cause conduction sets the transistor to its high threshold voltage ($V_{TH}$).

Figure 2:
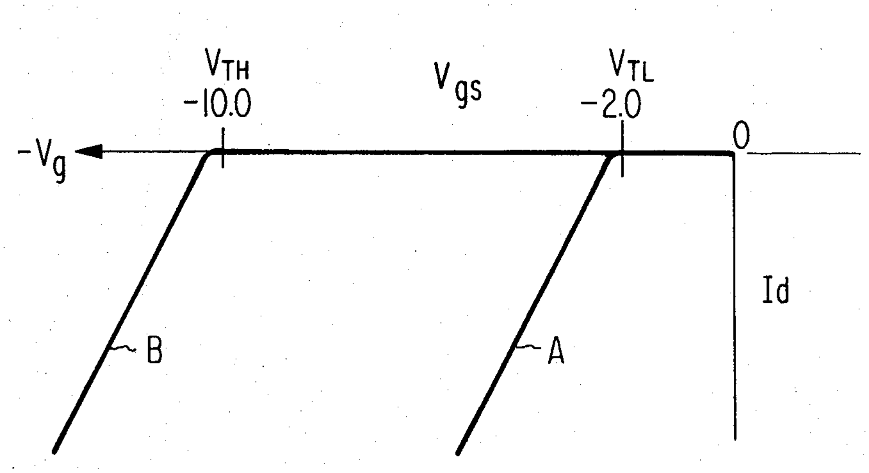
FIG. 2 is a graph illustrating the operating charcteristics of an MNOS transistor having the characteristics shown in FIG. 1.

The operating characteristic of the P-type MNOS transistor having the characteristic of FIG. 1 is illustrated in FIG. 2. For one condition (curve A) its threshold voltage ($V_{TL}$) is −2 volts and for the other condition (curve B) its $V_{TH}$ is −10 volts. That is, in one case (curve A) it conducts current when the gate is more negative than the source by 2 volts and in the other case (curve B) when the gate is more negative than the source by 10 volts. It should be emphasized that once the $V_T$ of the MNOS transistor is established, it behaves as an MOS transistor having that given threshold voltage, providing that the gate potential does not exceed either of the reference voltages.

Figure 3:
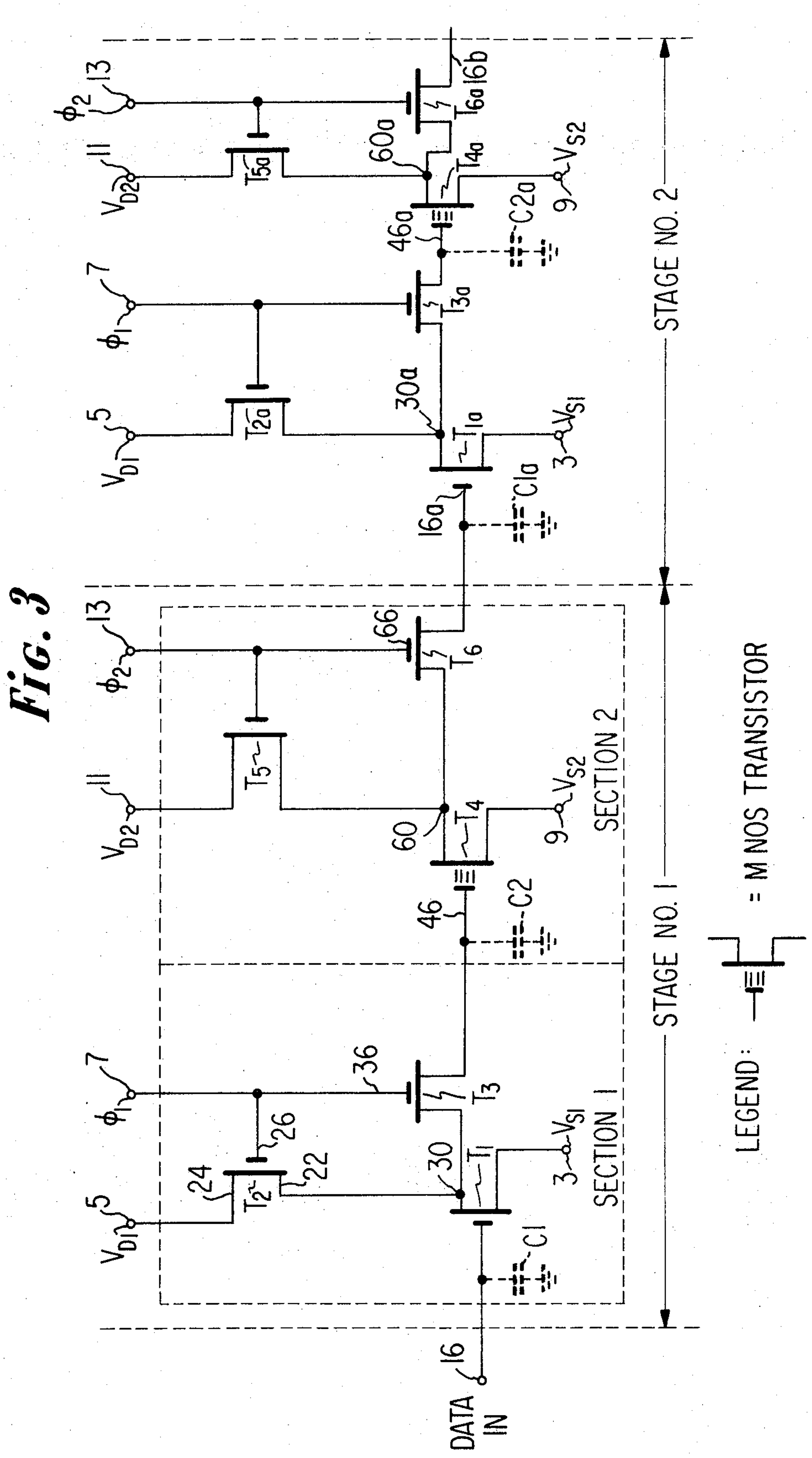
FIG. 3 is a schematic drawing of a shift register circuit embodying the invention.

The circuit of FIG. 3 includes two stages of an N-stage shift register, where each stage is identical to the other. Each stage includes a first section (P-type transistors T1, T2, T3) controlled by a first clock pulse ($\phi_1$) and a second section (P-type transistors T4, T5, T6) controlled by a second clock pulse ($\phi_2$). Input terminal 16 to which data signals are applied, is connected to the gate of amplifying and inverting transistor T1. The source-drain path of this transistor T1 is connected between terminal 3 and node 30. An operating voltage $V_{S1}$ is applied to terminal 3. The source-drain path of load transistor T2 is connected between node 30 and terminal 5. An operating voltage $V_{D1}$ is applied to terminal 5. The source-drain path of transmission gate transistor T3 is connected between node 30 and the gate 46 of transistor T4. Terminal 7, to which the $\phi_1$ clock pulse is applied, is connected to the gate 26 of transistor T2 and the gate 36 of transistor T3.

Amplifying and inverting transistor T4 is an MNOS device of the type having the characteristics illustrated in FIG. 1 and 2 and described above. To distinguish it from the other transistors of the stage, it is drawn with dashed lines between the gate and the semiconductor body. The source-drain path of transistor T4 is connected between node 60 and terminal 9. The potential $V_{S2}$ is applied to the latter terminal. The source-drain path of load transistor T5 is connected between node 60 and terminal 11. The potential $V_{D2}$ is applied to the latter terminal. The source-drain path of transmission transistor T6 is connected between node 60 and gate 16*a* of transistor T1*a*. Terminal 13 to which the $\phi_2$ clock pulse is applied is connected to the gate 56 of transistor T4 and the gate 66 of transistor T6. Capacitors C1 and C2, shown in phantom view, represent the total capacitance associated with nodes 16 and 46, respectively. These capacitors temporarily store the charge applied to their corresponding nodes.

The second stage (and subsequent stages which are not shown) is identical in structure and operation to the first stage and its components corresponding to those of first stage have been given like reference characters with the subscript *a* added.

Figure 4:
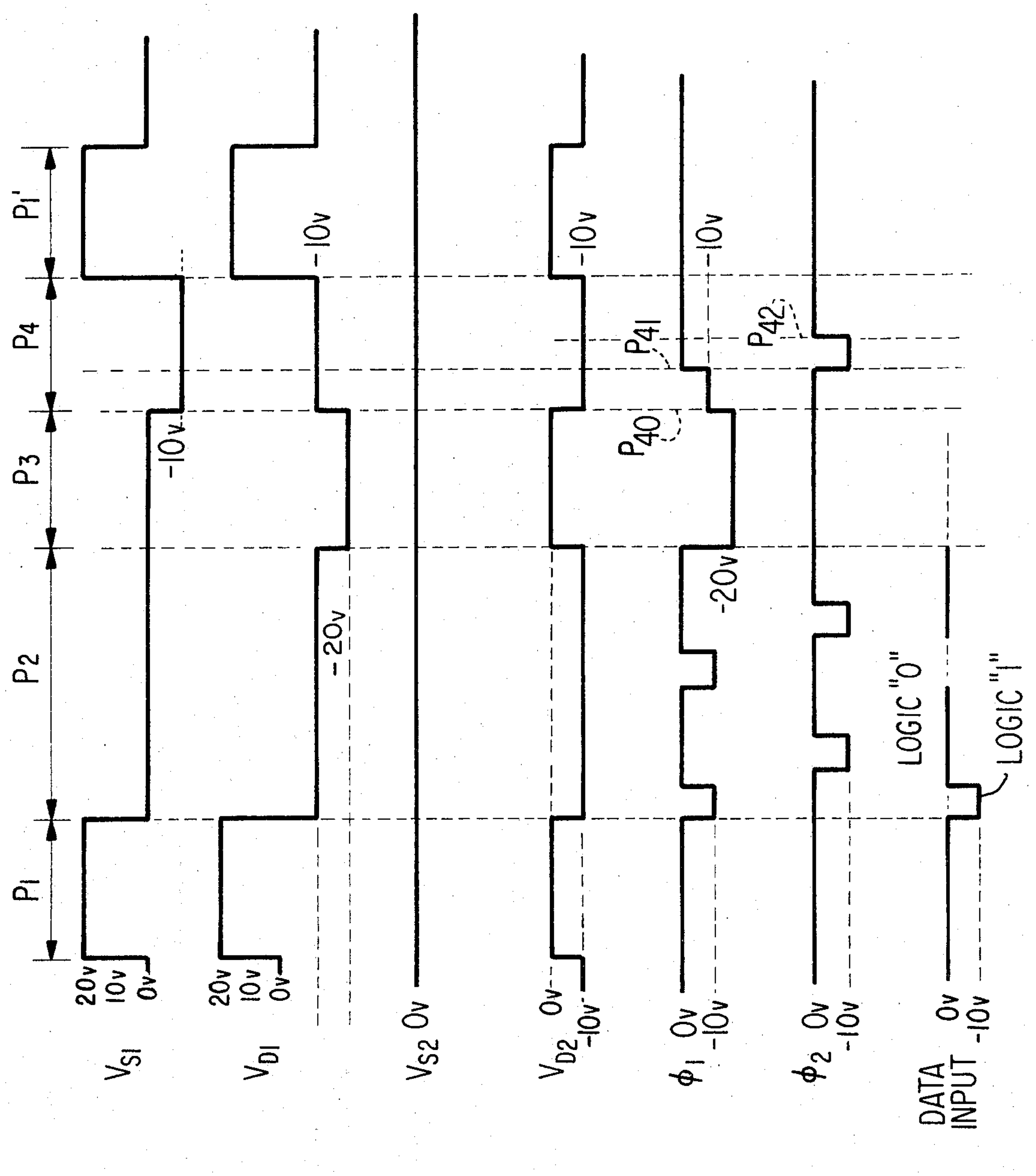
FIG. 4 is a drawing of waveforms of signals and potentials applied to the circuit of FIG. 3.

The operation of the circuit of FIG. 3 is best understood with reference to the waveforms shown in FIG. 4. During the period titled P1 all the MNOS transistors are set to their low threshold voltage ($V_{TL}$) state of −2 volts which is approximately equal to the $V_T$ of the MOS transistors of the circuit. The $V_{TL}$ of the MNOS transistor need not be exactly equal to the $V_T$ of the MOS transistors, but they must be near each other. Under this condition, the shift register is operated as a standard dynamic register and information is translated from stage to stage along the register. To set the MNOS transistors to the $V_{TL}$ state, a reverse potential of 20 volts is applied between its gate and its semiconductor body. This is achieved by setting the potentials $V_{S1}$ and $V_{D1}$ to +20 volts and by setting potentials $V_{S2}$, $V_{D2}$ and clock pulses $\phi_1$ and $\phi_2$ to zero volts.

With $V_{D1}$ at +20 volts and with $\phi_1$ at zero volts, transistor T2 is turned on and substantially the full $V_{D1}$ potential of +20 volts appears at node 30. With $V_{S1}$ at +20 volts, transistor T1, whose gate potential is at either zero or −10 volts, is also turned on and substantially the full $V_{S1}$ potential is applied to node 30. Note that even if transistor T1 were turned off, the +20 volt potential present at node 30 is not disturbed. Transistor T3 is turned on since its source (common with node 30) is at +20 volts and its gate 36 is at 0 volts ($\phi_1 = 0$). Therefore, substantially the full +20 volts from $V_{D1}$ and $V_{S1}$ is applied to the gate 46 of transistor T4. The +20 volts potential developed at the gate of transistor T4 is obtained by charging the gate capacitance through the conduction paths of transistors T2 and T3. This takes some finite amount of time.

With $V_{D2}$ and $\phi_2$ at zero volts, transistors T5 and T6 are cut off and node 60 is not clamped to any potential. Since no positive potential is ever applied to node 60, its potential is zero volts or less. Thus, the electrode (drain) of transistor T4 connected to node 60 is at most at zero volts and the electrode (source) of transistor T4 connected to terminal 9 is at $V_{S2}$ which is also at zero volts. Therefore, transistor T4 has +20 volts on its gate and zero volts across its source-drain path and these voltages set transistor T4 (as well as all the corresponding MNOS transistors in the other stages of the register) to the low threshold voltage ($V_{TL}$) state.

With the $V_T$ of the MNOS transistors set to about −2 volts and with the $V_T$ of the remaining MOS transistors also at about the same level, the register can be operated as a standard dynamic shift register. The potentials applied to the register during this phase are as shown for the period titled P2 in FIG. 4. The potentials applied to the transistors during the P2 period are maintained between 0 and −10 volts to ensure that the MNOS transistors are not stressed beyond the critical level of 15 volts. The standard mode of operation of one stage, which is well known, may be briefly described as follows.

A data input signal which may be at either zero volts (arbitrarily defined as logic "O") or −10 volts (arbitrarily defined as logic "1") is applied to data input terminal 16. This data signal is clocked into the section by means of an enabling $\phi_1$ clock pulse and is temporarily stored (in inverted form) at the nodal capacitance (C2) of the second section. The temporarily stored signal is transferred from node 46 to output node 16*a* in response to a $\phi_2$ clock pulse and is inverted again in the process. Node 16*a*, of course, is the input signal terminal for the following stage. During dynamic operation, both the $\phi_1$ and the $\phi_2$ clock pulses may be at the zero level but both may not be at the −10 volt (enabling) level at the same time. During the dynamic mode normally, first $\phi_1 = -10$, $\phi_2 = 0$; then $\phi_1 = \phi_2 = 0$; then $\phi_1 = 0$, $\phi_2 = -10$; then $\phi_1 = \phi_2 = 0$; then cycle repeats.

When $\phi_1$, which is normally at zero volts, goes to −10 volts, transistor T3 and T2 are turned on. If transistor T1 is turned on (i.e., −10 volts is applied to its gate) transistors T1 and T2 are both on with their source-drain paths connected in series between $V_{D1}$ (−10 volts) and $V_{S1}$ (0 volts). The transistors are manufactured such that the "on" impedance of load device T2 is substantially greater than that of amplifying device T1. Therefore, by voltage divider action, the potential at node 30 is close to ground potential and for purposes of this discussion will be considered to be at ground (zero volts). Transmission device T3 with −10 volts at its gate is turned on and couples the zero volt signal at node 30 to the gate 46 which charges capacitor C2 to the zero volt level.

When $\phi_1$ goes to −10 volts, if transistor T1 is cut off (i.e., zero volts is applied to its gate), transistors T2 and T3 conduct in the source-follower mode causing the potential at the gate 46 of transistor T4 to go negative towards −10 volts. Due to the threshold voltage drops of transistors T2 and T3 (assumed to be −2 volts) the potential at 46 will be limited to approximately −6 volts. When the $\phi_1$ pulse returns to zero volts, transistors T2 and T3 are cut off and the potential at gate 46 remains charged due to the holding action of the capacitance C2 present at the gate 46.

Summarizing the above, when the $\phi_1$ clock goes from zero volts to −10 volts, section 1 of each stage produces at its output node (46) the complement of the data signal present at its input terminal 16.

Section 2 of each stage with the $V_T$ of the MNOS transistor (e.g., T4) set to $V_{TL}$ operates in a manner which is identical to that of section 1. Section 2 produces at its output node 16*a* the complement of the data signal present at its input terminal 46 when the $\phi_2$ clock pulse goes from zero volts to −10 volts. Thus, following the application of a $\phi_1$ and a $\phi_2$ clock pulse, an input signal is translated from the input terminal 16 of a stage to the input terminal 16*a* of the next stage.

A string of input pulses can be serially loaded into the register and the information loaded in the register in the way described above may then be statically and non-volatilely stored by changing the various operating voltages as shown for the time interval P3 in FIG. 4. $V_{S1}$, $V_{S2}$, $V_{D2}$ and the $\phi_2$ clock are placed at zero volts and $V_{D1}$ and the $\phi_1$ clock are set to −20 volts.

With $V_{D2}$, $V_{S2}$ and $\phi_2$ clock at zero volts, transistors T5 and T6 are cut off. The potential at node 60 is approximately zero volts (as explained above) and since $V_{S2}$ is clamped to zero volts, the potential assumed by the substrate of the MNOS transistors will be approximately zero volts.

Assume that, under the conditions above, transistor T1 is "on" (i.e., −10 volts applied to terminal 16). With $V_{D1}$ and clock $\phi_1$ at −20 volts, transistors T2 and T3 are also on. Transistors T1 and T2 are on with their source-drain paths connected in series between $V_{S1}$ and $V_{D1}$. But, since the "on" impedance of transistor T2 is substantially greater than that of transistor T1 and since $V_{S1}$ is at zero volts, the potential at node 30 by voltage divider action will be close to zero volts. Transistor T3 couples the approximately zero volts present at node 30 to the gate 46 of transistor T4. The gate potential of MNOS transistor T4 is thus close to zero volts and the source-drain path is also at or near zero volts. The gate-to-substrate potential stress applied to MNOS device T4 is thus less than the critical 15 volts level and the transistor remains undisturbed in the $V_{TL}$ state to which it was previously set. Therefore, when transistor T1 is "on" the potential at node 30 is always more positive than −15 volts and the threshold of the MNOS transistor remains set at $V_{TL}$.

Assume now that, under the above named conditions, transistor T1 is off (i.e., zero volts applied to terminal 16). With transistor T1 "off" and transistors T2 and T3 conducting,the potential at node 30 goes towards −20 volts. Transistor T3 conducts in the source follower mode causing capacitor C2 to be charged to approximately the −20 volt level. Due to the threshold voltage drops of transistors T2 and T3, the actual potential will be somewhat more positive than −20 volt (e.g., −16 volts). Transistor T4 thus has about −16 volts applied to its gate and about zero volts applied across its source-drain path. There is thus more than a 15 volt potential applied across the gate insulator in a direction to turn the transistor on. This potential exceeds the 15 volt critical level and is sufficient to set the transistor to its high threshold voltage ($V_{TH}$) state.

Summarizing the above, with the circuit voltages those of interval P3 of FIG. 4, and a logic 1 (−10 volt level) signal present at the input terminal 16 to a stage, the threshold level of the MNOS transistor T4 of the stage remains at $V_{TL}$; with a logic 0 (zero volt level) signal present at the input terminal 16 to a stage, the MNOS transistor T4 of the stage instead is set to $V_{TH}$.

It should be clear from the discussion above that if the procedure described for period P3 is performed after the register is loaded, the states of the MNOS transistors ($V_{TL}$ or $V_{TH}$) will correspond to the bits previously dynamically stored at the various terminals 16, 16*a*, 16*b* . . .16*n*. Once this procedures is completed, the operating power applied to the circuit may be completely removed and the MNOS transistors will remain in the states to which they have been set for a long period of time (hundreds of hours) and thereby statically storing the register data for this period.

The information statically stored in the register may be recovered after the period of non-volatile storage by applying to the register the potentials shown for the time period labelled P4 in FIG. 4. First, for time P40 to P41, $V_{S2}$ and the $\phi_2$ clock are set to zero volts and $V_{S1}$, $V_{D1}$, $V_{D2}$, and the $\phi_1$ clock are set to −10 volts. $V_{S1}$ is set to −10 volts to ensure that even if transistor T1 is on, it will not affect the potential developed at node 30.

With $V_{D1}$ and $\phi_1$ at −10 volts the load devices (transistors T2, T2*a*) and the transmission devices (transistors T3, T3*a*) in section 1 of all the stages are turned on and conduct in the source-follower mode discharging the nodal capacitances (C2, C2*a*) towards $-V_{D1}$ volts. When operated in the source-follower mode, there is a voltage drop across each device equal to its threshold voltage which is assumed to be equal to 2 volts. Therefore, the potential coupled to the gate of transistors T4 and T4*a* is approximately equal to −6 volts.

The −6 volt level developed at the gate of the MNOS transistor T4 is midway between the range of $V_{TL}$ (−2V) and $V_{TH}$ (−10V) and as a result those MNOS transistors set to $V_{TH}$ remain cut off whereas those set to $V_{TL}$ are turned on. When the $\phi_1$ clock pulse as shown at time P41 in FIG. 4 is returned to zero volts, the gates of the MNOS transistors remain charged to −6 volts due to the charge accumulated on their capacitances. A $\phi_2$ clock pulse going to −10 volts at time P41 turns on the transmission devices in section 2 of all the stages and couples the outputs (node 60, 60*a* . . .etc.) of the MNOS transistors to the input (terminal 16*a*, 16*b* . . .etc.) of the next stage. For example, assuming transistor T4 to be set to $V_{TL}$, it will conduct and the potential at node 60 will be close to zero volts which potential will be coupled by transistor T6 to the input of transistor T1*a*. Assuming transistor T4a to be set to $V_{TH}$, it will not conduct and node 60*a* will be charged towards −10 volts which potential will be coupled through transmission device T6*a* to the input 16*b* of transistor T1*b* (not shown) of the next stage.

The threshold state of the device which was set to correspond to given binary data is, therefore, reconverted into standard voltage levels and shifted one section down. The data that was stored in the MNOS transistors is thus recovered. At this point the MNOS transistors can be reset to the low voltage threshold state as described for period P1 above and the process of operating the register in its normal mode as described for period P2 can be repeated.

Note that when storing and recovering the information, there is an inversion of the data applied to a stage. That is, a −10 volt stage input signal sets the MNOS transistor to $V_{TL}$ which in turn produces a stage output signal of 0 volts and a zero volt stage input signal sets the MNOS transistor to $V_{TH}$ which in turn produces a stage output signal of −10 volts. This contrasts to the standard dynamic operating mode in which there is no inversion of the data translated by a stage. This, however, does not present a serious systems problem. If the shift register is operated such that only one store operation occurs per set of data bits loaded into it, a single inverter stage at the end of the register restores the information to the correct format. If more than one store operation occurs per set or per partial set of data bits loaded in the register a simple counter arrangement can switch in an inverter for the odd number of store operations and switch it out for even number of store operations.

I claim:

1. A storage circuit comprising, in combination:
- a data translating stage including a semiconductor device capable of assuming two different conditions, where for one condition the device has a given current level for a given applied voltage and for the second condition the device has a different current level for said given applied voltage;
- means for setting and maintaining said semiconductor device in one condition for dynamically translating binary data bits through said stage; and
- means for causing said device to store a data bit statically comprising means for applying a control voltage to said stage and means in said stage responsive to said control voltage and the bit applied to said stage, for retaining the semiconductor device of said stage in its original condition if the bit applied to the stage is of one value and for placing the semiconductor device of said stage in its other condition if the bit applied to the stage is of the other value.

2. In a storage circuit as set forth in claim 1, wherein said semiconductor device is a field-effect transistor of the type whose threshold voltage is electrically alterable.

3. In a storage circuit as set forth in claim 2, said semiconductor device comprising a metal-nitride-oxide transistor.

4. In a data translating stage having first and second sections operable during first and second successive time intervals, said first section coupling signals between the stage input terminal and an intermediate node and the second section coupling signals between the intermediate node and the stage output terminal, the improvement comprising:
- a field effect transistor whose threshold level is electrically alterable in one of said sections;
- means for operating said transistor at a first threshold level for dynamic data translation; and
- means responsive to a signal present at said input terminal and to a control signal manifestation for retaining said transistor at said first threshold level when said bit represents one binary value and for changing the threshold level of said transistor to a second value when said bit represents the other binary value, thereby statically storing said signal.

5. The combination as claimed in claim 4 further including means for restoring said stage from the static mode to the dynamic mode of operation including means for applying a control signal to said transistor for producing a data signal at the output of the stage corresponding to the threshold level to which said transistor is set and for then resetting said transistor to said first threshold level.

6. A data translating stage comprising:
- a field-effect transistor of the type whose threshold level is electrically alterable having its control electrode connected to an input node and its source to a first power terminal, a load device connected between the drain of said first transistor and a second power terminal and a transmission device coupled between the drain of said first transistor and an output node;
- means for setting the threshold level of said transistor to a first value including means for maintaining its source-drain path at one potential and applying a reverse bias potential to said control electrode;
- means for coupling data signals to said input node; and
- means for statically storing data including means responsive to data signals of given value, for setting the threshold level of said transistor to a second value including means for maintaining its source-drain path at said one potential and applying a forward bias potential to said control electrode, and responsive to data signals of less than said given value for retaining the threshold of the transistor at said first value.

7. The combination as claimed in claim 6 wherein said stage includes an input terminal and wherein said means for setting said transistor and for coupling data signal to said input node includes a signal translating section comprising a second field-effect transistor having its control electrode connected to said input terminal, its source connected to a third power terminal and its drain connected through a load device to a fourth power terminal; and
- wherein the signals developed at the drain are coupled through a transmission device to said input node.

8. The combination as claimed in claim 7 wherein said load devices and said transmission devices are insulated-gate field-effect transistors.

9. The combination as claimed in claim 7 wherein said means for setting said electrically alterable transistor includes means for applying selected potentials to said third and fourth power terminals and means for turning on said load and transmission devices of said signal translating section for coupling said selected potentials from said third and fourth power terminals to the control electrode of said transistor whose threshold level is electrically alterable.

10. A data translating stage operable during first and second consecutive time intervals to translate information signals from the input terminal to the output terminal of said stage comprising:
- a first section including a first field-effect transistor (FET) whose threshold level is electrically alterable connected at its control electrode to an intermediate node and at its source to a first power terminal, a load transistor connected between the drain of said first transistor and a second power terminal and a transmission transistor coupled between the drain of said first transistor and said output terminal;
- a second section including an amplifying device connected at its control electrode to said input terminal and having first and second electrodes defining the ends of a conduction path, the first electrode being connected to a third power terminal, a load device connecting said second electrode to a fourth power terminal and a transmission device coupled between said second electrode and said intermediate node; and means for applying selected potentials to said four power terminals; and means for statically storing information signals including means for selectively enabling said load and transmission devices of said second section for setting the threshold level of said first FET to one of two values corresponding to the value of an information signal applied at said input terminal.

11. A circuit which is capable of both dynamic and static operation comprising, in combination:

a plurality of transistors interconnected to operate as a data translation stage, one of said transistors having an electrically alterable threshold level;

means for dynamically translating signals through said stage comprising means for operating said one transistor solely at one of its threshold levels while applying input signals to said stage;

means for statically storing an input signal applied to said stage comprising means, including at least some of said transistors, responsive to said signal and to a control signal manifestation for retaining said one transistor at its original threshold level when said signal represents a bit of one binary value and for switching said one transistor to a second threshold level when said signal represents a bit of the other binary value.

* * * * *